US012776967B2

(12) United States Patent
Anasta et al.

(10) Patent No.: US 12,776,967 B2
(45) Date of Patent: Oct. 27, 2026

(54) SYSTEMS AND METHODS FOR REDUCING IMPACT OF FAILED MESSAGE EVENTS

(71) Applicant: Capital One Services, LLC, McLean, VA (US)

(72) Inventors: Jude Anasta, Hudson, NY (US); Sainath Gulari, Wilmington, DE (US)

(73) Assignee: Capital One Services, LLC, McLean, VA (US)

( * ) Notice: Subject to any disclaimer, the term of this patent is extended or adjusted under 35 U.S.C. 154(b) by 27 days.

(21) Appl. No.: 19/079,366

(22) Filed: Mar. 13, 2025

(65) Prior Publication Data

US 2026/0281010 A1 Sep. 17, 2026

(51) Int. Cl.
*H04L 41/5025* (2022.01)
*H04L 5/00* (2006.01)

(52) U.S. Cl.
CPC ........ *H04L 41/5025* (2013.01); *H04L 5/0055* (2013.01)

(58) Field of Classification Search
CPC .......................... H04L 41/5025; H04L 5/0055
See application file for complete search history.

(56) References Cited

U.S. PATENT DOCUMENTS

2006/0294228 A1* 12/2006 Almstrom .............. G06Q 40/04 709/224
2010/0313064 A1* 12/2010 Boctor ................ H04L 43/0811 709/224

* cited by examiner

*Primary Examiner* — Soe Hlaing
(74) *Attorney, Agent, or Firm* — Foley & Lardner LLP

(57) ABSTRACT

Methods and systems are described herein for preventing network resource failures. For example, a message describing that an event associated with an update to network resource data failed to be received by the network resource may be detected. Message payload data including instructions for services to be accessed to update the network resource data can be extracted from the message. Health status information indicating that access to one or more services were unsuccessful can be determined and monitored. Upon determining that a network connection disruption associated with a previously unavailable or inaccessible service has ended, the message payload data can be provided to that service(s).

20 Claims, 4 Drawing Sheets

SYSTEMS AND METHODS FOR REDUCING IMPACT OF FAILED MESSAGE EVENTS

BACKGROUND

Message queues are essential components in distributed systems, enabling asynchronous communication by decoupling producers from consumers and temporarily storing messages until they can be processed. This architecture enhances scalability and fault tolerance, making message queues critical for applications like real-time analytics and data processing. However, traditional message queue systems face challenges disseminating accurate data to components of distributed systems when there are errors in message processing.

SUMMARY

Methods and systems are described herein for novel uses and/or improvements to the message queue system. As an example, these methods and systems provide improved techniques for determining that a failed message should be retried based on analysis of network connections with associated services.

To process messages, message queue systems interact with network resources, such as services that can manage information associated with the messages. For example, message queue systems may receive messages (e.g., from message producer devices) including message payload data, and provide the message payload data to one or more network resources. However, while these allow message queue systems to improve scalability and fault tolerance in message processing, technical problems relating to network connectivity disruptions and/or general unavailability can still persist. For example, network connections (e.g., connections through which the message queue system can provide the message payload data to the network resources) may experience disruptions resulting in temporary, or possibly prolonged, unavailability.

These disruptions may result from a number of possible sources: malfunctioning hardware (e.g., damaged cables), network congestion, configuration mistakes in the network, third-party (e.g., internet service provider) service disruption, and/or issues with the network resource itself, and the like. Network connection disruptions may cause network resource failures. For example, failing to process messages from the message queue may cause network resources to provide users with incorrect data leading to network failures as the user may attempt unavailable actions based on incorrect information provided by a network resource. Furthermore, multiple retry attempts may be submitted due to confusion about the source of the error, leading to increased network resource consumption, data transmission delays, increased costs to submit API/graph-based requests, and other resource-related issues.

Systems and methods described herein may prevent network resource failures caused by incorrect network resource data by quickly and efficiently resolving failed messages based on health status updates received from network resources. In some examples, the message queue system may determine that a received message has failed to be delivered to a network resource identified by the message header data. For example, this may be determined based on receiving a failure message or failing to receive any response from the network resource within a threshold period of time. As a result, the message may be placed in a failed message queue where it can be retrieved to be retried at a later time, reducing the repeating re-try loop experienced due to confusion regarding the error (e.g., its source).

In some examples, the message queue system can periodically retry messages within the failed message queue based on submitting API calls to check the health status (e.g., network connection availability) of network resources for which message delivery has failed. Not only can periodically submitting low-overhead API calls to check the health status of network resources quickly identify restored network connections, but it can also more efficiently determine restored network connections than retrying transmission of the entire message. The improved message queue system may retry messages promptly after determining, based on the health status updated, that the network connection associated with the failure to deliver the message has been restored. As a result, message failure events may be more quickly resolved, allowing network resources to swiftly update their information to reflect the message payload data associated with the message. This may reduce user request submissions emanating from incorrect data that does not reflect the message payload data within the message that failed to be processed. Still further, user requests based on incorrect data may lead to network resource failures as the requests may not actually be completed. For example, users may submit requests they are not permitted to perform or lack authorization and/or resources to complete based on the incorrect data.

Furthermore, a dead letter queue may allow the system to separate out messages that require further analysis such that they do not affect another (e.g., main) queue. For example, the system may separate messages that have been determined to fail for reasons other than a failed network connection or that have already been retried a threshold number of times. Isolating specific messages into the dead letter queue can enhance system efficiency by enabling a main queue to process incoming messages without being hindered by the isolated ones.

In some aspects, methods and systems for preventing network resource failures from incorrect network resource data resulting from failed messages within a message queue system are described. For example, the methods and systems may include receiving, from a message producer device, a message describing an event associated with a network resource of the message producer device, wherein the message includes message payload data to update first network resource data stored in network resources. The methods and systems may also include extracting, from the message payload data, a first application programming interface (API) of the first cloud-based service and a second API of a second cloud-based service with which to provide the message payload data to update the first network resource data. In addition, the methods and system may include accessing a service health dashboard of a message service queue storing health status information for a plurality of cloud-based services including the first cloud-based service and the second cloud-based service; determine, based on the health status information, that a first network connection to connect to the first cloud-based service via the first API is available and a second network connection to connect to the second cloud-based service via the second API is unavailable. The methods and systems may further include adding the message to a failed message queue that stores messages relating to failed updates to network resource data, wherein the failed message queue determines, at a predefined temporal interval, whether one or more health status updates relating to one or more of the plurality of cloud-based receives were received. The methods and systems may also include detecting, after the predefined temporal interval has elapsed, a health status update received by the failed message queue indicating that the second network connection is available. In addition, the methods and systems may include based on the health status update, providing, via the second API, the message payload data to the second cloud-based service; and responsive to determining that the message payload data has been provided to the first cloud-based service and the second cloud-based service, cause the first network resource data stored by the network resource management database to be updated.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRA WINGS

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
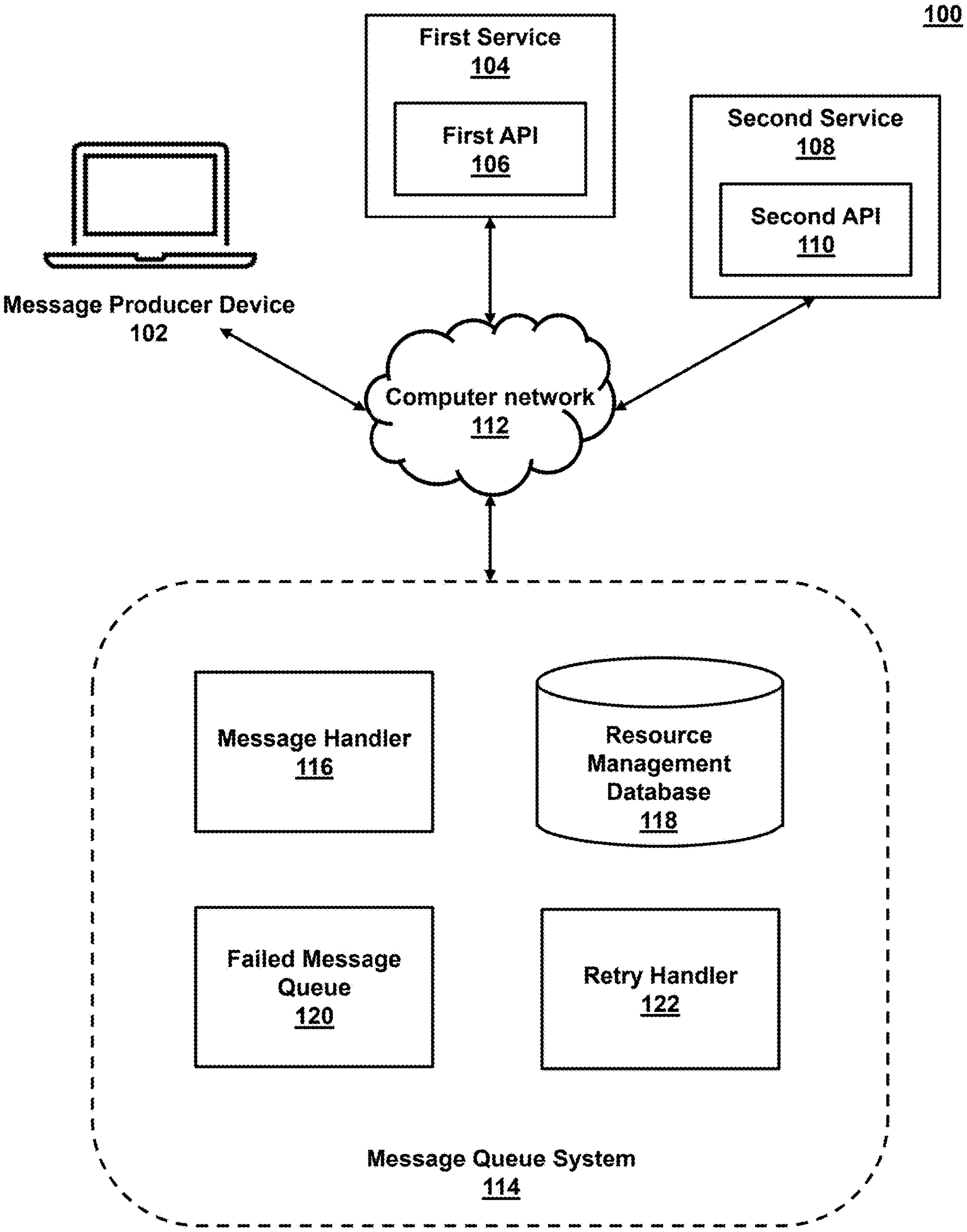
FIG. 1 shows an illustrative system for resolving failed messages within a message queue system, in accordance with one or more embodiments.

FIG. 1 shows an illustrative system 100 for resolving failed messages within a message queue system, in accordance with one or more embodiments. For example, system 100 of FIG. 1 shows a message producer device 102, a first service 104, a second service 108, a computer network 112, and a message queue system 114. Although first service 104 and second service 108 are shown in system 100, additional services, or other components, can be included in system 100. In some embodiments, first service 104 and second service 108 may be associated with a first Application Programming Interface (API) 106 and a second API 110, respectively. First API 106 and second API 110 may enable first service 104 and second service 108 to communicate with computer network 112. For example, message queue system 114 may communicate over computer network 112 with first service 104 via first API 106 and with and second service 108 via second API 110.

Message producer device 102 may transmit, via computer network 112, a message to message queue system 114. For example, the message may comprise a request (e.g., a request to adjust a temperature of a building, an order, input data for an artificial intelligence model, a medical request for a procedure, and/or the like). As an example, a message may comprise a request, submitted by a device (e.g., such as message producer device 102), to create an event for a particular time (e.g., day, hour, minute) at a particular geographic location.

In some embodiments, message producer device 102 may be a message broker. In these embodiments, message producer device 102 may receive messages from one or more producer devices (e.g., other instances of message producer device 102 functioning as described above) and route them to one or more message queues. For example, message producer device 102 may route a message to an appropriate message queue (e.g., such as message queue system 114) based on the content within the message. Additionally, message producer device 102 may manage delivery of messages to message queues. For example, message producer device 102 may store messages based on determining that they have not been successfully delivered to a message queue.

In some embodiments, the message may include message payload data. For example, the message payload data may include content or information carried within a message, such as text, a JSON, or binary data, which is processed by the receiving system to perform an intended operation. In an example, where the message refers to a request for provisioning virtual computing resources, the message payload data may include the type of resources requested (e.g., CPU, memory, storage), the quantity of each resource, and the duration for which the resources are needed. In another example, where the message refers to a request to input data to a prediction model, the message payload data may include the input features required by the model (e.g., image pixel values, embeddings, historical data, user demographics), the format of the data (e.g., CSV, JSON), and any preprocessing steps that need to be applied before feeding the data into the model. In still another example, where the message refers to a transaction, the message payload data may include a transaction amount, a recipient, and a payee. In yet another example, where the message refers to a scheduling request, the message payload data may include a time, a type of appointment, and relevant entities (e.g., email addresses of participants).

The message may include message header data. In some embodiments, the message payload data may include the message header data. In some examples, the message header data may indicate relevant services. For example, the message header data may include interface information that indicates a service by including metadata such as endpoint identifiers associated with an application programming interface (API) corresponding to the service. The message header data may also include metadata regarding a message sender, a message recipient, a timestamp, content type/content information, routing details, and the like. The message routing data may assist the messaging process, including routing and managing messages efficiently without inspecting the message body. As an example, processing the message may involve interactions with first service 104 and second service 108. In this example, the message header data may include endpoint identifiers associated with first API 106 and second API 110 to guide message queue system 114 to route the message to the appropriate API(s) for processing.

Message queue system 114 may receive messages. For example, message queue system 114 may receive messages from one or more message producer devices, such as message producer device 102. Message queue system 114 may act as a buffer, allowing different components to independently retrieve and process messages at their own pace. In an example, where the message refers to a request for provisioning virtual computing resources, message queue system 114 may allow services such as a resource request services (e.g., message producer device 102), resource allocation services (e.g., first service 104), and monitoring services (e.g., second service 108) to operate independently, ensuring that resource requests are processed efficiently and reliably. In another example, where the message refers to a request to input data to a prediction model, message queue system 114 may allow services such as data collection (e.g., message producer device 102), data preprocessing (e.g., first service 104), and model prediction (e.g., second service 108) to operate independently, ensuring that data is processed and fed into the model accurately and efficiently. Still, as another example, where the message is a request to perform a medical imaging scan, message queue system 114 may allow services such as a scan request system (e.g., message producer device 102), scheduler system (e.g., first service 104), and a consent form system (e.g., second service 108) to operate independently, reducing the effect of errors in one service on the rest of the system. Furthermore, requests may be reliably stored in the message queue until processed, preventing loss if systems are temporarily offline and allowing the message queue to handle large influxes of messages.

In some embodiments, message queue system 114 may retain messages until they are retrieved. For example, message queue system 114 may hold messages until they are retrieved by first service 104 and/or second service 108 via network connections over computer network 112. Additionally, or alternatively, message queue system 114 may transmit information to network resources via computer network 112. For example, message queue system 114 may transmit messages to first service 104 and/or second service 108 via network connections over computer network 112. The network connections may be links (e.g., Ethernet, Wi-Fi, and/or the like) between devices that enable transfer of data, such as the message payload data. In some examples, message queue system 114 may include a service health dashboard. For example, message queue system 114 may update the service health dashboard based on information about the availability of services. The service health dashboard may display information (e.g., via a GUI) about which network connections are available/accessible. In an example, the service health dashboard may be updated based on updated health status information.

In some embodiments, message queue system 114 may include a message handler 116, a resource management database 118, a failed message queue 120, and/or a retry handler 122. Message handler 116 may receive new messages. For example, message queue system 114 may transmit a message to message handler 116 based on the message being received from message producer device 102. In some examples, message handler 116 may store the message in resource management database 118. The message may be stored in resource management database 118. In some examples, the message may be stored in resource management database 118 until all of the services indicated by the message header data have successfully processed the message. In some examples, services may retrieve the message to process it. In some examples, message handler 116 may access one or more network resources (e.g., services) based on receiving the message.

In an example, where the message is a request to provision virtual computing resources, message handler 116 may access a service (e.g., resource allocation service) to allocate the requested virtual computing resources. Additionally, or alternatively, the service may access the message queue handler 116 to retrieve the message. For example, the service may regularly check the message handler 116 for messages (e.g., poll for messages) and/or be triggered to retrieve the message by an event (e.g., notification of message, system performance metrics. In response to successfully accessing and/or being accessed by a service (e.g., successfully provisioning the virtual computing resources), message handler 116 may access resource management database 118. Message handler 116 may indicate successful interaction with the service and/or successful processing of the message by the service in resource management database 118. In some examples, in response to failing to access and/or be accessed by the service (e.g., not successfully provisioning the virtual computing resources due to one or more issues with the network and/or resource allocation service), message handler 116 may transmit the message to failed message queue 120. In these examples, message handler 116 may indicate that the message failed to be processed by the service in resource management database 118. In another example, where the message refers to a request to input data to a prediction model, message handler 116 may access a service (e.g., data preprocessing service) to prepare and input the data into the prediction model. In response to successfully accessing a service (e.g., successfully inputting the data into the prediction model), message handler 116 may access resource management database 118. Message handler 116 may indicate successful access of the service and/or successful processing of the message by the service in resource management database 118. In some examples, in response to failing to access the service (e.g., not successfully inputting the data into the prediction model due to one or more issues with the network and/or data preprocessing service), message handler 116 may transmit the message to failed message queue 120. In these examples, message handler 116 may indicate that the message failed to be processed by the service in resource management database 118. In yet another example, where the message is a request to perform a medical imaging scan, message handler 116 may access and/or be accessed by a service (e.g., first service 104) to schedule the medical imaging scan. In response to successfully interacting with a service (e.g., successfully scheduling the medical imaging scan), message handler 116 may access resource management database 118. Message handler 116 may indicate successful access of the service and/or successful processing of the message by the service in resource management database 118. In some examples, in response to failing to access the service (e.g., not successfully scheduling the medical imaging scan due to one or more issues with the network and/or scheduling service), message handler 116 may transmit the message to failed message queue 120. In these examples, message handler 116 may indicate that the message failed to be processed by the service in resource management database 118.

First service 104 and second service 108 may provide specific functionalities related to the messages and/or network resource data associated with the messages. For example, first service 104 and/or second service 108 may perform operations based on messages. In an example, first service 104 and/or second service 108 may retrieve messages from the message queue system 114. For instance, the first service 104 and/or second service 108 may regularly poll the message queue system 114 at predefined intervals to check for new messages. Additionally, or alternatively, these services may be triggered to retrieve a message by specific events, such as the arrival of a new message, reaching a message threshold, or other system-defined conditions. In an example, first service 104 and second service 108 may update respective network resource data associated with each service based on the message payload data included in the message. As an example, first service 104 may update network resource data including the allocation of virtual computing resources based on a provisioning request included in the message. This update process may involve several rules and conditions, such as verifying the availability of resources, ensuring that the requested resources do not exceed the allocated quota, and applying any relevant policies or constraints. The network resource data associated with first service 104 may be stored in a first service database. As another example, second service 108 may display a GUI with the status of the provisioned resources based on the provisioning request associated with the message. Similarly to first service 104, the second service may update respective network resource data stored in a second service database. In some examples, first service 104 may interact with second service 108. For example, second service 108 may generate a GUI including information provided by first service 104. In these examples, the services may interact over computer network 112. For example, second service 108 may retrieve the status of the provisioned resources from first service 104 to generate the GUI. In this example, a network connection failure between message queue system 114 and second service 108 may also result in a network connection failure between first service 104 and second service 108. As an alternate example, first service 104 and second service 108 may update their respective network resource data independently. For example, first service 104 and second service 108 may independently determine the status of the provisioned resources. In this example, first service 104 may perform enhanced validation checks to ensure the proper allocation and availability of resources, while second service 108 may generate an abstracted representation of resource status for user accessibility.

As another example, first service 104 may update network resource data including input data for a prediction model based on a data input request included in the message. This update process may involve several rules and conditions, such as verifying the format and completeness of the input data, ensuring that the data meets the required preprocessing steps, and applying any relevant transformations or normalizations. The network resource data associated with first service 104 may be stored in a first service database. As another example, second service 108 may display a GUI with results of the prediction model based on the input data associated with the message. Similarly to first service 104, second service 108, in this example, may update respective network resource data stored in a second service database. In some examples, first service 104 may interact with second service 108. For example, second service 108 may generate a GUI including information provided by first service 104. In these examples, the services may interact over computer network 112. For example, second service 108 may retrieve the prediction results from first service 104 to generate the GUI. In this example, a network connection failure between message queue system 114 and second service 108 may also result in a network connection failure between first service 104 and second service 108.

As yet another example, first service 104 may update network resource data including account balances based on a transaction amount included in the message. This update process may involve several rules and conditions, such as verifying the transaction's validity, ensuring that the transaction amount does not exceed the available balance, and applying any relevant fees or charges. The network resource data associated with first service 104 may be stored in a first service database. As another example, second service 108 may display a GUI with recent transactions based on the transaction associated with the message. Similarly to first service 104, the second service may update respective network resource data stored in a second service database. In some examples, first service 104 may interact with second service 108. For example, second service 108 may generate a GUI including information provided by first service 104. In these examples, the services may interact over computer network 112. For example, second service 108 may retrieve an account balance from first service 104 to generate the GUI. In this example, a network connection failure between message queue system 114 and second service 108 may also result in a network connection failure between first service 104 and second service 108. As an alternate example, first service 104 and second service 108 may update their respective network resource data independently. For example, first service 104 and second service 108 may independently determine account balances for user accounts. In this example, first service 104 may perform enhanced validation checks to ensure the authenticity and integrity of the transaction, while second service 108 may generate an abstracted representation of transaction data for user accessibility.

First service 104 may be accessed via first API 106. Similarly, second service 108 may be accessed via second API 110. First API 106 and second API 110 may define a set of rules and protocols for how requests and responses should be formatted. Services 104 and 108 may receive requests from message queue system 114 via computer network 112 and transmit responses via their respective APIs. For example, first API 106 may receive requests from message queue system 114 (e.g., JSON payload, XML payload, and/or the like) and transmit a response (e.g., result of a requested operation, relevant data, and/or the like). The response may, for instance, be the result of one or more operations performed by first service 104. Similarly, second API 110 may receive requests and transmit responses from second service 108. In some embodiments, one or more errors may occur due to issues such as invalid data, failed authentication, exceeded rate limits, or service unavailability. For example, there may be errors in requests transmitted from message queue system 114 (e.g., HTTP status code 400 "Bad Request" indicating invalid request format, and/or the like) or errors associated with the services (e.g., HTTP status code 503 "Service Unavailable" indicating the service is unavailable due to maintenance or being overloaded, HTTP status code 429 "Too Many Requests" indicating that an API has received too many requests, and/or the like). As a result, message queue system 114 may not be able to successfully submit a request to a service. In these embodiments, the message may be transmitted to failed message queue 120.

Failed message queue 120 may be a queue for failed messages, wherein the messages are periodically retrieved from failed message queue 120 to be retried. As described herein, a messaging queue refers to a form of asynchronous service-to-service communication used in serverless and microservices architectures. Messaging queues can allow messages to be stored in a queue (e.g., a data structure) until they are processed by the receiving system, ensuring reliable and scalable message handling even if the receiving system is temporarily offline or busy. Based on a failed initial try of the message, message handler 116 may transmit the failed message to failed message queue 120.

In some embodiments, retry handler 122 may return a failed message to failed message queue 120 based on one or more failed transmission attempts. In response to receiving the failed message, failed message queue 120 may determine if the failed message should not be retried. In some embodiments, failed message queue 120 may include a dead letter queue (DLQ). The failed message may be transmitted to the DLQ (e.g., a data structure) based on determining that it should not be retried. For example, failed message queue 120 may determine that a failed message should not be retried based on certain errors or exceptions being generated on the initial attempt, the message having expired (e.g., the message has remained in the queue longer than its allowed time-to-live (TTL)), a threshold number of retry attempts being satisfied, and/or not meeting certain format or content criteria (e.g., contains an invalid data type, which will not be resolved in subsequent attempts). As a result, the system may prevent message loss and allow for further analysis of failed messages without burdening the rest of message queue system 114.

Retry handler 122 may determine whether failed messages should be retried based on one or more conditions. For example, retry handler 122 may determine that a failed message should be retried based on a determination that a threshold period of time has passed since the failed message was received. As another example, retry handler 122 may determine that a failed message should be retried based on a determination that one or more services is available. In this example, retry handler 122 may determine if a service is available (e.g., by performing a health check that returns an HTTP status code). Based on receiving a response to this check that is associated with a certain status (e.g., HTTP status 20X), failed message queue 120 may determine the failed message should be retried. In this example, retry handler 122 may determine that a service associated with the failure or a service that is downstream from the service associated with the failure is available. In response to determining that the failed message should be retried, retry handler 122 may retrieve the failed message from failed message queue 120 and retry the message. Based on determining that the retry was successful, retry handler 122 may perform one or more operations on resource management database 118.

In an example, where the message refers to a request to provision virtual computing resources, the message event may be determined to be successful (e.g., in reference to a resource allocation service) based on the requested virtual computing resources being successfully provisioned or successfully determining that the virtual computing resources cannot be provisioned (e.g., due to resource unavailability) for the specified request. In some examples, the retry of the message event may be unsuccessful. As an example, an error code indicating that the resource allocation service is unavailable may be returned in response to the retry. In response to determining that the retry is not successful, retry handler 122 may return the failed message to failed message queue 120. After the message is returned to failed message queue 120, the message may be retrieved for subsequent retries or determined to be unsuitable to be retried, and therefore placed in the DLQ. In another example, where the message is a request to input data to a prediction model, the message event may be determined to be successful (e.g., in reference to a data preprocessing service) based on the data being successfully input into the prediction model or successfully determining that the data cannot be processed (e.g., due to data format issues). In some examples, the retry of the message event may be unsuccessful. As an example, an error code indicating that the data preprocessing service is unavailable may be returned in response to the retry. Based on the retry not being successful, retry handler 122 may return the failed message to failed message queue 120. After the message is returned to failed message queue 120, the message may be retrieved for subsequent retries or may be determined to be unsuitable for additional retries (and subsequently placed in the DLQ). In yet another example, where the message is a request to schedule a medical imaging scan on a certain day at a certain time, the message event may be determined to be successful (e.g., in reference to a scheduling service) based on the medical imaging scan successfully being scheduled for the specified date and time or successfully determining that the medical imaging scan cannot be scheduled (e.g., due to another patient being scheduled) for the specified date and time. In some examples, the retry of the message event may be unsuccessful. As an example, an error code indicating that the scheduling service is unavailable may be returned in response to the retry. In response to determining that the retry is not successful, retry handler 122 may return the failed message to failed message queue 120. After the message is returned to failed message queue 120, the message may be retrieved for subsequent retries or determined to be unsuitable to be retried, and therefore placed in the DLQ.

Resource management database 118 may include network resource data associated with messages received by message queue system 114, responses output by message queue system 114, databases for storing data, and the like. For example, resource management database 118 may include network resource data comprising information about a status of a message. In response to successful execution of the message event, retry handler 122 and/or message handler 116 may update the status of the message in resource management database 118. Alternatively, in response to an unsuccessful execution of the message event, retry handler 122 and/or message handler 116 may update information associated with the message to indicate the failure of the message event.

Resource management database 118 may store messages. In some examples, resource management database 118 may store messages until they are successfully processed (e.g., received by the appropriate services). For example, resource management database 118 may store a message until an indication is received from message handler 116 or retry handler 122 that the message has been successfully processed by services that had previously failed to process the message. In some embodiments, resource management database 118 may include other information associated with messages such as TTL counters, delivery time, load balancing information, encryption keys needed to perform a message event, and/or the like.

Network resource data may include information associated with operations performed over the network. For example, network resource data may include information associated with the content and/or status of messages. In an example, the network resource may include the message payload data (e.g., a transaction amount). The network resource data may include information associated with services that is updated based on the message payload data (e.g., the status of virtual machine provisioning, the input features and preprocessing steps for a prediction model, the scheduled date and time for a medical imaging scan, account balances, etc.). As an example, for provisioning virtual computing resources, the network resource data may include (i) statuses of virtual machine provisioning (e.g., pending, active, failed), (ii) type and quantity of resources allocated (e.g., CPU cores, memory size, storage capacity), (iii) duration for which the resources are/expected to be provisioned and resource utilization metrics (e.g., CPU usage, memory usage) and the like. As another example, for inputting data to prediction models, the network resource data may include (i) input features required by the prediction model (e.g., historical data, user data) (ii) format of the input data (e.g., CSV, JSON), (iii) preprocessing steps applied to the data (e.g., normalization, encoding), (iv) and the status of data processing (e.g., whether the data has been received, preprocessing is complete, or the data has been input to the model), and the like. As yet another example, for scheduling medical scans, the network resource data may include (i) the scheduled date and time for the medical imaging scan, patient information like patient ID and medical history, and the type of scan to be performed, such as MRI or CT scan. Additionally, this network resource data may include the status of the scheduling request, indicating whether it is scheduled, rescheduled, or canceled.

In some examples, the services may be associated with network resource data stored in respective databases. For example, first service 104 may be associated with network resource data stored in a first service database. First service 104 may perform one or more functionalities based on network resource data in the first service database. As an example, first service 104 may determine if an appointment slot is available based on network resource data comprising available appointment time slots stored in the first service database. In this example, first service 104 may also modify network resource data in the first service database to indicate that an appointment time slot is no longer available based on a message comprising a request to book an available time slot. Likewise, second service 108 may be associated with network resource data stored in a second service database. Second service 108 may similarly perform one or more functionalities based on network resource data in the second service database. As an example, second service 108 may determine if appropriate registration (e.g., consent forms, identification documents, and/or the like) has been performed for a booked appointment based on network resource data in the second service database. In this example, second service 108 may also modify network resource data in the second service database to indicate that registration for an appointment has been completed based on receiving a message comprising the appropriate registration forms.

Figure 2:
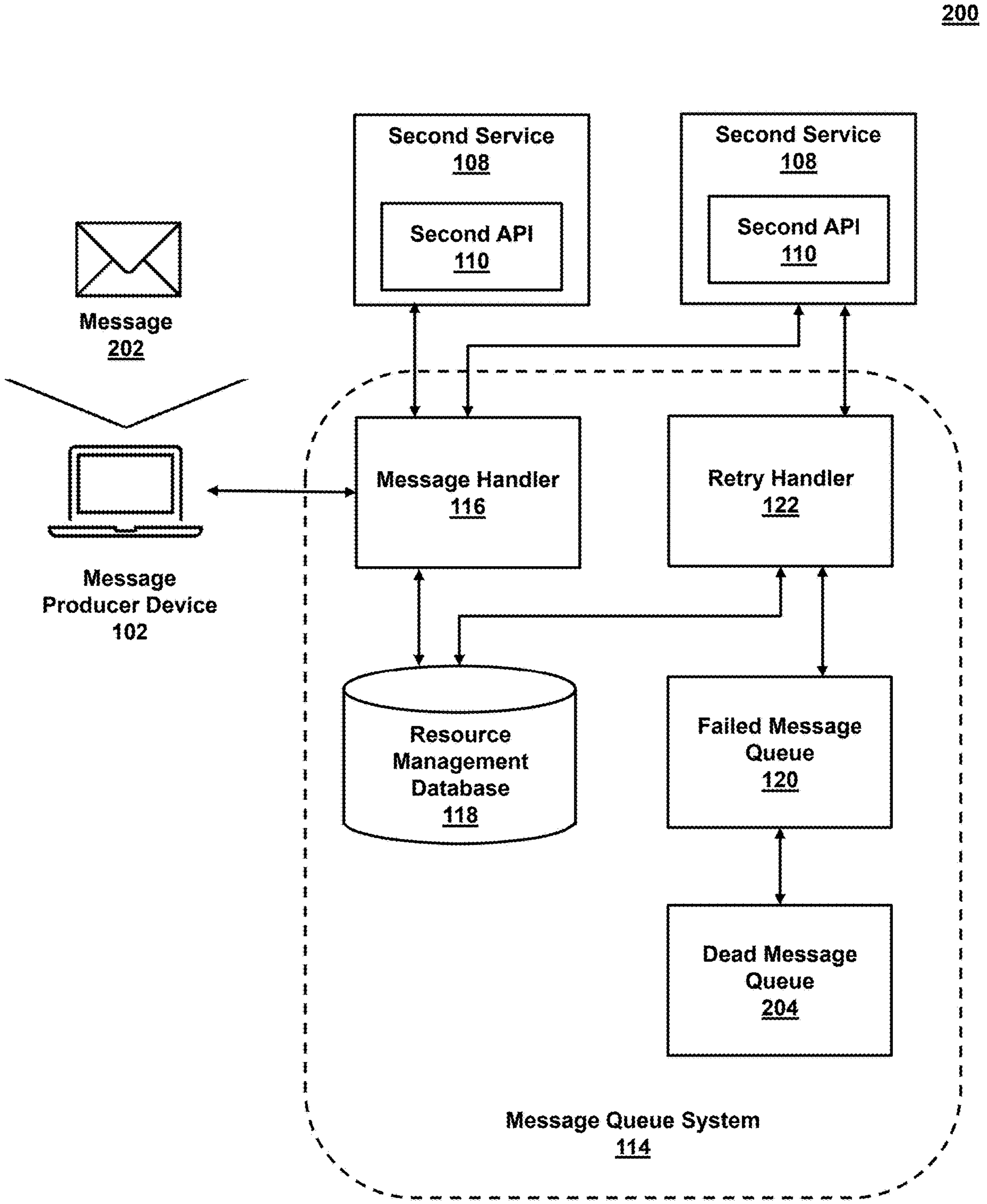
FIG. 2 shows an illustrative flow diagram of a process for resolving failed messages within a message queue system, in accordance with one or more embodiments.

FIG. 2 shows an illustrative diagram 200 of a process for resolving failed messages within a message queue system, in accordance with one or more embodiments. For example, the message queue system (e.g., message queue system 114) may receive messages (e.g., data packets including requests to modify and/or transfer network resource data associated with services) that are to be provided to services (e.g., systems that can execute operations associated with the message, such as processing and allocating resources, returning information, generating user interfaces, validating the message, and/or the like). These services may provide functionalities related to message payload data included with the message and may update respective network resource data based on the message payload data.

In some examples, the message may be unable to be provided to one or more of the services (e.g., due to failed network connections). As depicted in diagram 200, message queue system 114 may periodically check the health status of services (e.g., first service 104, second service 108). In some cases, message queue system 114 may determine whether to retry sending a message that previously failed to be provided to a service (e.g., due to failed network connections). This can enable message queue system 114 to efficiently determine when and how to reduce network resource failures caused by failed messages, thereby reducing unnecessary (and avoidable) network communications (e.g., unresponsive API calls) to services. In an example, the message queue system 114 may include components such as message handler 116, resource management database 118, failed message queue 120, retry handler 122, and dead message queue 204 that are capable of executing operations associated with processing incoming messages.

In some embodiments, a message producer device (e.g., message producer device 102) may generate a message 202. Message producer device 102 may receive a message including a request from a user to access, modify, share, delete, duplicate, or perform other operations on information associated with one or more services. As an example, message 202 may be a request to perform an action, such as via an IoT device (e.g., adjust the temperature of a temperature control device), submit an order, input data for an artificial intelligence model, submit a request for a medical procedure, and/or the like.

Message producer device 102 may transmit message 202 to message queue system 114. In some embodiments, message queue system 114 may manage incoming messages, such as message 202. Managing incoming messages may include determining whether the message (e.g., message 202) includes a request to access and/or modify network resource data. As mentioned previously, message queue system 114 may be associated with one or more services (e.g., first service 104, second service 108). Message queue system 114 may transmit message payload data to first service 104 and/or second service 108. Alternatively, first service 104 and/or second service 108 may retrieve message 202. For example, first service 104 and/or second service may retrieve message 202 from message queue system 114 based on polling (e.g., checking the message queue system 114 at regular intervals) for the messages and/or in response to an event triggers (e.g., the arrival of a new message, reaching a message threshold, or a scheduled interval. Based on the message payload data, first service 104 and/or second service 108 may modify, update, create, share, etc., network resource data. In an example, interacting with first service 104 and second service 108 may include submitting API calls to an API associated with first service 104, such as first API 106, or second service 18, such as second API 110. Message queue system 114 may be configured to pass messages as structure requests, which can allow specific actions or workflows in a target service to be triggered. For example, API calls may cause the services to update their respective network resource data (e.g., virtual machine provisioning statuses, input features/parameter values, scheduling information, account balances).

In some examples, the services may be associated with different responsibilities. For instance, in service provisioning virtual computing resources, first service 104 may be configured to allocate virtual machines, while second service 108 may monitor resource usage and generate reports. In another example, where the request involves inputting data to a prediction model, first service 104 may handle data preprocessing, and second service 108 may manage the model prediction. Additionally, in a service for requesting medical imaging, first service 104 may schedule the scan, and second service 108 may handle patient consent forms. For example, first service 104 may be configured to increase the account balance of a user based on an account deposit included in message 202. In some examples, second service 108 may utilize information from first service 104 to generate user interfaces. For example, second service 108 may utilize account balances managed by first service 104 to generate user interfaces.

In real-word applications, for example, network connection issues with services (e.g., services 104 and 108), message queue system 114, message producer devices, or with other components of system 100, can occur. These network connection issues can cause subsequent problems, particularly as a result of message delivery failures emanating from network connection issues. A service that fails to receive a message may be unable to update vital user resource information, compromising subsequent resource usage attempts due to incorrect information. For example, where the service refers to provisioning virtual machines, a user may request the allocation of a virtual machine with specific resources. If the message fails to reach the resource allocation service, the virtual machine may not be provisioned, leading to delays in the user's tasks and potential resource allocation conflicts. As another example, if the service refers to inputting data to a prediction model, a user may submit data for preprocessing. If the message fails to reach the data preprocessing service, the data may not be processed correctly, resulting in inaccurate predictions and potentially flawed decision-making. As yet another example, if the service refers to scheduling medical imaging, a user may request an appointment for a scan. If the message fails to reach the scheduler system, the appointment may not be scheduled, causing delays in the patient's diagnosis and treatment. Additionally, the patient may receive incorrect information about their appointment status, leading to confusion and potential missed appointments. As yet another example, where the services refer to user account services, a user having an available account balance of $100 may submit message 202 comprising a request to pay $25. An error may occur in the transmission of message 202 to second service 108, causing second service 108 to generate and output a user interface displaying the incorrect account balance of $100. Thus, when the user attempts to use their account for a subsequent $80 purchase, the transaction will be declined due to insufficient funds even though the information presented to the user (e.g., via the user interface provided by second service 108) indicates that sufficient funds exist to approve the transaction.

Described herein are systems and methods configured to efficiently determine, within a networked computing environment, when a failed message should be resubmitted to a service, submitted to another service, prevented from being submitted to a service, or perform other operations to reduce service downtime, resolve failed messages quicker, reduce computing resources used to retry message submission attempts, and the like. Failure to process messages can cause system errors and inefficiencies in various real-world applications of message queue systems. As an example, failure to process a first message by a calendar display service may result in a timeslot being displayed as open, while the first message has been successfully processed and booked by a scheduling service. This may lead to network failures, as subsequent messages that include a request to book the timeslot may fail (e.g., since it is already booked), which can lead to inefficiency in the network. Furthermore, the network failures may delay successful scheduling of the appointment. In this example, retrying the first message once the network connection to the calendar display service is restored, so that it may be processed, may result in fewer messages that result in network failures (e.g., unsuccessful booking of an appointment). As another example, failure to process a first message associated with an IoT system including a request to change a building temperature for a building temperature control service may cause inefficiencies in the system. For example, the building may be maintained at the incorrect temperature (e.g., causing undesired and inefficient energy usage) and/or may receive additional requests to change the building temperature due to unsuccessful processing of the first request (e.g., since the building temperature has not changed as requested in the first message). In this example, retrying the first message once the network connection to the building temperature control system is restored may result in less unwanted function of the system and/or less additional messages including requests to change the building temperature. As a result, retrying the message based on determining a restored network connection may reduce network failures and/or additional requests, and may thereby increase the efficiency of the message queue system.

In some embodiments, message queue system 114 (e.g., message handler 116) may perform operations based on message 202. Based on the interactions between message queue system 114, first service 104, and/or second service 108 message queue system 114 may determine whether message 202 was successfully processed. If message 202 is successfully processed, message queue system 114 may perform one or more operations on stored network resource data (e.g., stored using resource management database 118). For example, a status of message 202 in resource management database 118 may be updated to indicate that message 202 was successfully processed. Alternatively, message queue system 114 (e.g., message handler 116) may determine that message 202 is a failed message. For example, message queue system 114 may determine that a failure occurred based on a timeout condition being satisfied. Satisfying the timeout condition may include, for example, a response failing to be received from an associated service within a threshold amount of time (e.g., within 60 seconds or less, within 10 seconds or less, within 5 seconds or less, within 1 second or less, or other times). In this example, the timeout condition may be satisfied once this threshold time has elapsed. Message queue system 114 (e.g., using retry handler 122) may transmit a status of message 202 to resource management database 118. For example, based on message 202 failing to be processed by second service 108 (e.g., due to the timeout condition being satisfied), retry handler 122 may update information (e.g., network resource data) associated with message 202 in resource management database 118.

In some embodiments, message queue system 114 may be configured to place message 202 in a failed message queue (e.g., failed message queue 120) based on the necessary resources to process message 202 failing to access message 202 or failing to receive a response/confirmation that message 202 was provided to the service within a threshold amount of time. In some embodiments, message queue system 114 may include a dead message queue 204. Message 202 may be placed in dead message queue 204 based on a determination that it should not be retried. For example, the retry handler 122 may determine whether message 202 should be retried. As an example, retry handler 122 may place message 202 in dead message queue 204 based on a threshold number of retry attempts being performed (unsuccessfully). Additionally, or alternatively, message 202 may be placed in dead message queue 204 based on a threshold amount of time elapsing prior to a response being received indicating successful transmission of message 202 to its corresponding services, determination that includes corrupt data, system resource constraints, and/or the like.

In some examples, retry handler 122 may be configured to extract message payload data from message 202. For example, retry handler 122 may be configured to extract message payload data in response to message 202 being placed in failed message queue 120. Additionally, or alternatively, retry handler 122 may be configured to extract message payload data in response to determining that message 202 should be retried (e.g., by the failed message queue 120). In an example, the extracted message payload data may include information about services having failed network connections causing errors when attempting to process message 202. This information may be part of message header data within the message payload data. In an example, the message payload data may be extracted in response to one or more services failing to retrieve the message 202.

In some embodiments, retry handler 122 may retrieve messages from failed message queue 120 to retry. For example, retry handler 122 may determine the health of a service associated with the failure of message 202 by periodically submitting queries to the service associated with the failure of message 202. Upon determining a health status update indicating the service is available, retry handler 122 may retrieve message 202 from the failed message queue 120 and retry it. As another example, retry handler 122 may determine that message 202 failed to be processed due to a failed network connection to second service 108 based on metadata associated with message 202. In this example, retry handler 122 may periodically submit API calls to second service 108 to determine if there is a health status update to second service 108. The API calls may be submitted to second API 110 that is associated with second service 108. Using API calls to determine the health status of services may utilize fewer network resources than retrying message 202. For example, the health check API call may involve a simple request and a lightweight response, such as a status code. This may, for instance, reduce network and processing overhead in comparison to retrying message 202.

In an example, retry handler 122 may receive a response from a service previously not accessible or available (e.g., second service 108) indicating that the service has been restored. In response, retry handler 122 may retrieve message 202 from failed message queue 120 and retry message 202.

In some embodiments, message 202 may not be successfully processed by the retry or by a certain number of retries. As an example, the network connection may alternate between being available and unavailable (e.g., due to network congestion, variances in signal strength, and/or the like), which could result in the health status showing a restored connection but the retry of message 202 to still failing. As a result of message 202 failing to be processed, retry handler 122 may return message 202 to failed message queue 120. Alternatively, message 202 may be transmitted to dead message queue 204 based on a threshold number of retry attempts being executed (and, for example, failing).

In some embodiments, message 202 may be successfully processed as a result of a retry attempt performed by retry handler 122. For example, message 202 may be determined to be successfully processed based on message payload data being successfully provided to second service 108. As a result of message 202 being successfully processed, retry handler 122 may update data in resource management database 118. For example, retry handler 122 may update a status associated with message 202 to reflect that message 202 has been successfully processed. Updating a status can include adding an entry indicating successful processing (e.g., successful processing by an individual service or successful processing of all associated services) and/or changing a status flag (e.g., "pending," "processed," and/or the like) associated with message 202. Additionally, or alternatively, retry handler 122 may update a status associated with second service 108 based on the successful processing of message 202. Similarly, updating a status can include logging a successful message event as an entry associated with second service 108 and/or changing a status flag (e.g., "unavailable," "available," and/or the like).

Figure 3:
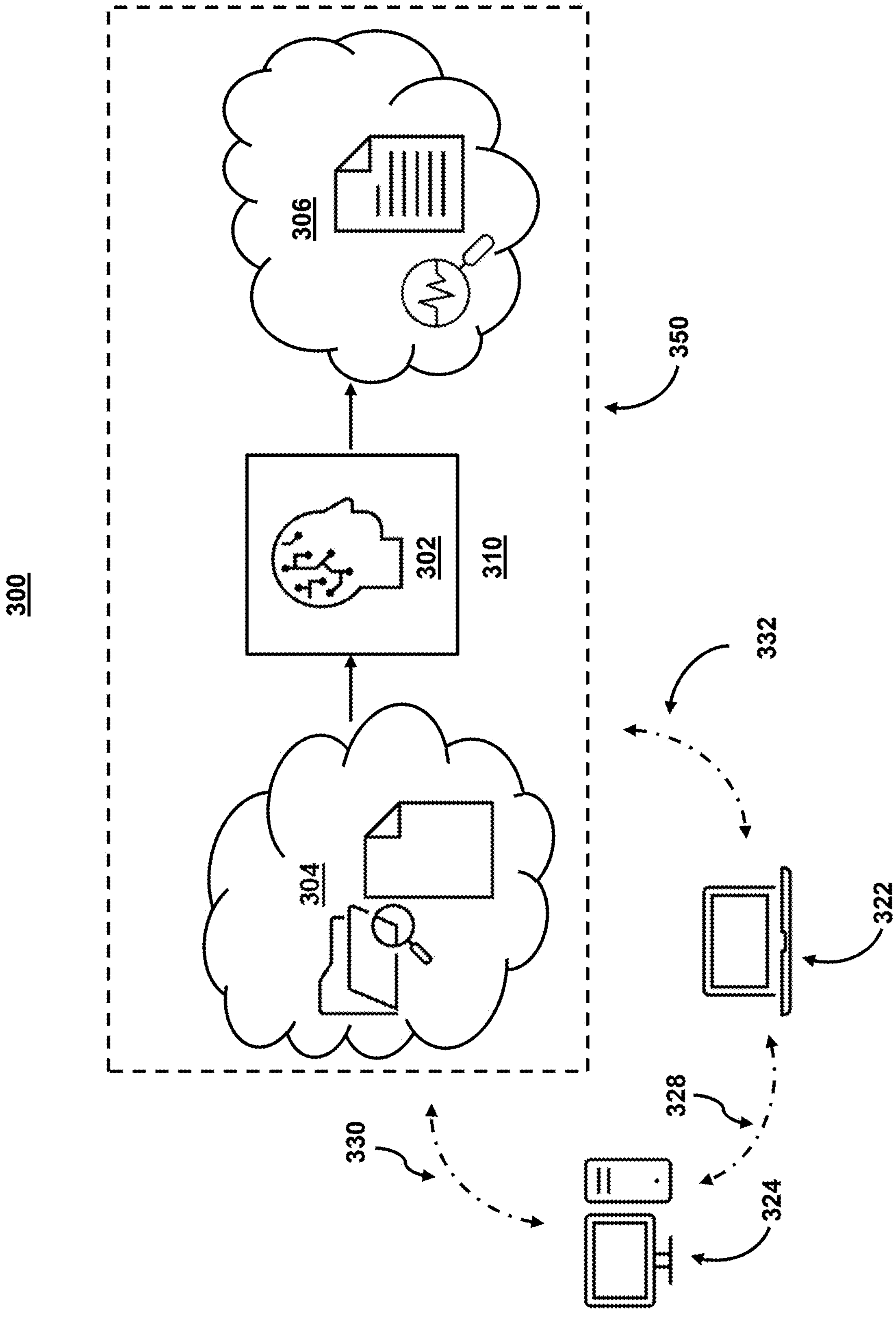
FIG. 3 shows illustrative components for a system used to resolve failed messages within a message queue system, in accordance with one or more embodiments.

FIG. 3 shows illustrative components for a system used to prevent network resource failures from incorrect network resource data resulting from failed messages within a message queue system, in accordance with one or more embodiments. For example, FIG. 3 may show illustrative components for a message queue system that determines when a connection to a service associated with a failed message has been restored and retries the failed message based on this determination. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system and may feature one or more component devices. It should also be noted that system 300 is not limited to three devices. Users may, for instance, utilize one or more devices to interact with one another, one or more servers, or other components of system 300. It should be noted, that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as touchscreen smartphones, these displays also act as user input interfaces. It should be noted that in some embodiments, the devices may have neither user input interfaces nor displays and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storage. The electronic storage may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice, or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include a message queue system (e.g., message queue system 114 of FIG. 1), a message producer device (e.g., message producer device 102 of FIG. 1), and/or one or more services (e.g., first service 104 and second service 108 of FIG. 1). In an example, cloud components 310 may include a model 302, which may be a machine learning model. Model 302 may take inputs 304 (e.g., messages, service health dashboard, API calls, status codes, and/or the like) and provide outputs 306 (e.g., health status update, failed message event, and/or the like).

The inputs may include multiple datasets, such as a training dataset, test datasets, validation datasets, or other information. Each of the plurality of datasets (e.g., inputs 304) may include data subsets related to messages received by the message queue system and/or connections with services associated with the message queue system. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction to indicate if a health status update from a service indicates that it is now available. Alternatively, the system may train the first machine learning model to classify the first labeled feature input with the known prediction to indicate if a message failed to be received by the appropriate network resources.

Cloud components 310 may access a resource management database (e.g., resource management database 118 of FIG. 1) including statuses of received messages. Additionally, or alternatively, cloud components 310 may access storage of services associated with the message queue system.

Cloud components 310 may include model 302, which may be a machine learning model, artificial intelligence model, etc. (which may be referred collectively as "models" herein). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., whether a health status update from a service indicates that it is now available or whether a message failed to be received by a network resource).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., whether a health status update from a service indicates that it is now available or whether a message failed to be received by a network resource).

In some embodiments, the model (e.g., model 302) may automatically perform actions based on outputs 306. In some embodiments, the model (e.g., model 302) may not perform any actions. The output of the model (e.g., model 302) may be used to identify that a message has failed to be received by the appropriate network resources or identify that a failed message should be retried based on an associated service being determined to be available based on a health status update of the associated service.

System 300 also includes API layer 350. API layer 350 may allow the system to generate summaries across different devices. In some embodiments, API layer 350 may be implemented on mobile device 322 or user terminal 324. Alternatively, or additionally, API layer 350 may reside on one or more of cloud components 310. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web-services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying WAF and DDoS protection, and API layer 350 may use RESTful APIs as standard for external integration. Additionally, persons of ordinary skill in the art will recognize that graph-based systems may be used and, in such scenarios, Graph APIs may be used instead of or in addition to RESTful APIs (e.g., GraphQL).

Figure 4:
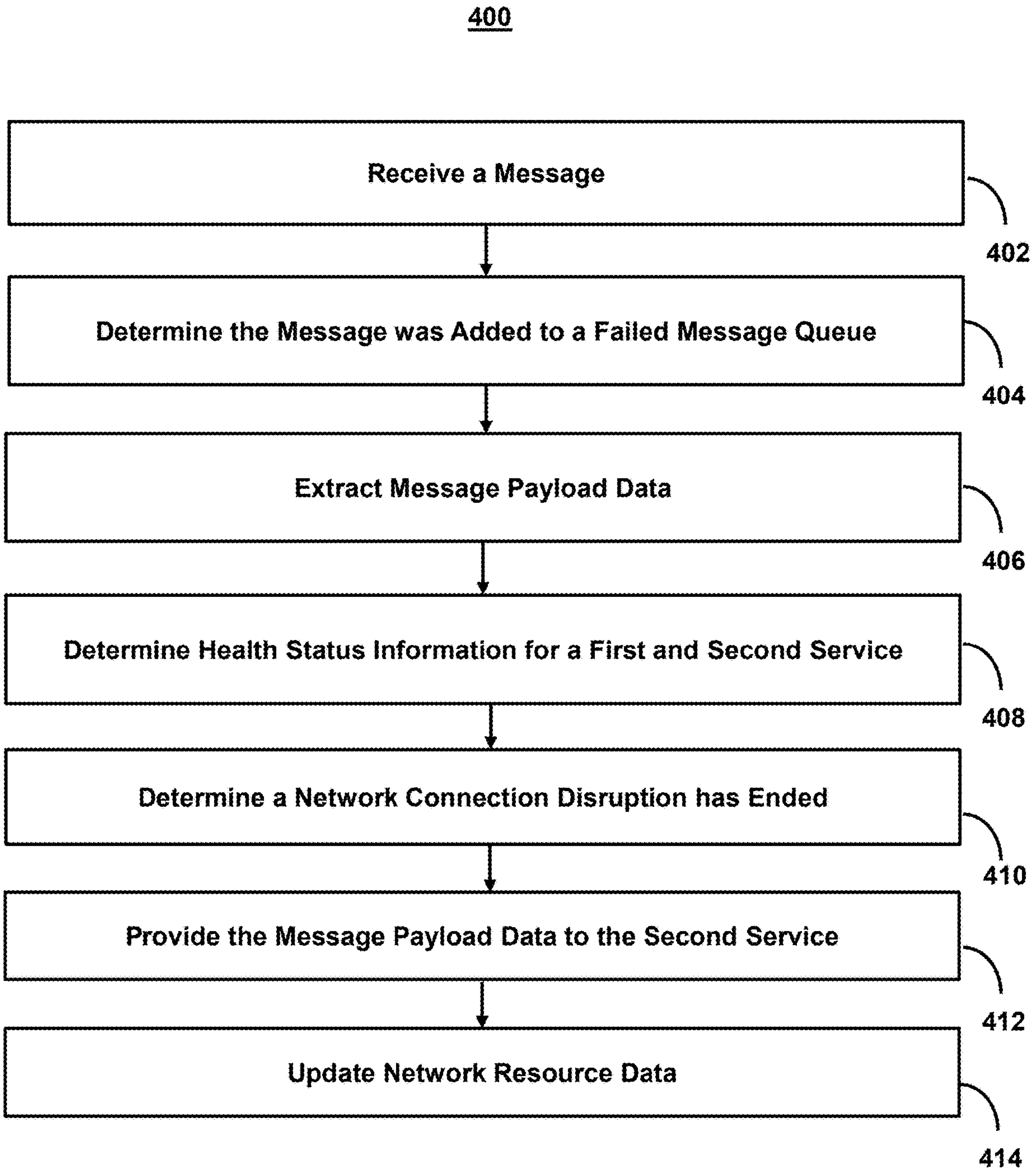
FIG. 4 shows a flowchart of a process involved in resolving failed messages within a message queue system, in accordance with one or more embodiments.

FIG. 4 shows a flowchart of a process 400 involved in preventing network resource failures from incorrect network resource data resulting from failed messages within a message queue system, in accordance with one or more embodiments. For example, process 400 may be implemented using one or more computing systems, such as message queue system 114 of FIG. 1, or other components described herein. In some embodiments, process 400 may begin at step 402.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

At step 402, process 400 (e.g., using one or more components described above) may receive a message. For example, a message queue system can receive a message including message payload data. The message payload data may include information that describes an event associated with a network resource (e.g., microservice, web service, container, database, load balancer, and/or the like) of the message producer device. The message may also include message header data that identifies services to which the message should be provided. For example, the message header data may indicate APIs that the message payload data should be provided to. In an example, the message may be associated with a first service that updates balances of user accounts to reflect transactions, such as payments or deposits. Additionally, or alternatively, the message may be associated with a second service that generates user interfaces displaying the balance of an account. As an example, the event may be a transaction, and the first service may update first network resource data based on successfully processing the message. In some examples, the message queue system may provide received messages to a handler component, such as a message handler, in response to receiving the message. In these examples, the handler component may manage these messages and determine whether they have been successfully processed. In an example, the handler component may provide these messages to services indicated by the message header data. Alternatively, services may retrieve associated messages (e.g., periodically and/or based on a trigger event) from the handler component.

In some embodiments, messages may be stored in a network resource management database. For example, the message queue system may store messages in the network resource management database in response to receiving the messages. The messages may be stored alongside details of processing. For example, the message may include time stamps and indications of actions associated with the message (e.g., receipt of message, retry attempt, successful processing, and/or the like). In some examples, the messages may be stored until they have been successfully processed by all the appropriate services (e.g., all of the services identified by the message header data). In an example, at least part of the message may be deleted in response to the message being successfully processed by the appropriate services. For example, the message payload data may be deleted from the network resource management database in response to the message being successfully processed by the appropriate services.

In some embodiments, the message queue system may determine that the message failed to be received based on a timeout condition being satisfied. For example, after attempting to deliver message payload data to a service, the message handler may determine that a response has failed to be received within a threshold period of time. As another example, the message handler may determine that the service failed to retrieve the message within a threshold period of time from which it was received from the message producer device. In some examples, the message producer device may be a device from which the user submits the message (e.g., user device such as a laptop, cellular device, and/or the like). In an example, the message handler may provide the message to the services. For example, the message handler may deliver the message payload data by submitting API calls to services associated with the message (e.g., services identified by the message header data). In another example, the services may retrieve the message based on periodically polling the handler component for messages. In response to successfully delivering the message to a service, the message handler may receive a response from the service confirming receipt of the message. In some examples, the message handler may determine that no response has been received within a threshold period of time. The threshold period of time may be measured from the time the message was received from the message producer device or the time the message was provided and/or retrieved by the service. In response to determining that no response has been received within a threshold period of time, the message handler may determine that a messaging timeout condition has been satisfied, and therefore the message failed to be received by the network resource. Alternatively, the message handler may determine that the message failed to be received by the network resource based on receiving a failure message from the network resource. As an example, the network resource may transmit a failure message in response to a failed attempt to retrieve the message. In some examples, the message handler may transmit the failed message to a failed message queue within the message queue system based on determining that the failed message failed to be received by the network resource.

At step 404, process 400 (e.g., using one or more components described above) may determine the message was added to a failed message queue. For example, the failed message queue may receive the message from the message handler. In an example the retry handler may identify that the message has been placed in the failed message queue (e.g., based on a notification from the failed message queue and/or message handler, period checks of the failed message queue, and/or the like). In some examples, the retry handler may determine whether messages should be retried in the future based on the failed message queue receiving the message that failed to be received by the network resource. In some examples, the failed message queue may be associated with a dead message queue. In these examples, the retry handler may place the message in the dead message queue in response to determining that it should not be retried. The dead message queue may contain messages that are unlikely to be resolved through retries. For example, the message may contain errors such as corruption, format mismatch, invalid data, and/or the like that are not caused by network connection errors. Messages with such errors may remain unresolved despite retries, potentially overloading the system. As a result of transferring these messages to the dead letter queue, the message queue system may ensure that messages that have failed due to network connection issues are efficiently resolved.

In some embodiments, the message queue system may generate a notification that the message was added to the failed message queue. For example, the failed message queue may generate the notification in response to receiving the message. Alternatively, the message handler may generate the notification in response to determining that the message failed to be received by the network resource. The notification may comprise the message (e.g., message payload data) and/or an indication of the network resource that the message failed to be provided to. In some examples, the notification may be transmitted to the retry handler. Based on receiving the notification, the retry handler may determine whether the message should be retried (e.g., and therefore stay in the failed message queue) or not (e.g., and therefore transferred to the dead message queue). Additionally, or alternatively, the notification may be transmitted to the message producer device. Based on receiving the notification, the message producer device may display the notification (e.g., as a pop-up alert, banner, and/or the like). Additionally, or alternatively, the notification may be displayed on the message queue system. For example, the message queue system may be associated with a device (e.g., computer, mobile device, and/or the like) that can display the notification.

At step 406, process 400 (e.g., using one or more components described above) may extract message payload data. For example, the retry handler may extract message payload data comprising instructions for services to be accessed to update the network resource data based on the message being added to the failed message queue. The message payload data may be extracted based on parsing the message. In an example, the message may include message header data (e.g., as part of the message data or as a separate part of the message) including metadata that identifies relevant services for processing the message. In some examples, the message may be considered successfully processed based on the services successfully being accessed and/or associated network resource data being successfully updated. In an example, the metadata may also include other transmission information, such as encryption information. For example, the metadata may include encryption keys and algorithms to ensure that the message is securely transmitted and accessed only by authorized entities.

In some embodiments, extracting message payload data may include parsing the message to identify relevant APIs and submitting API calls to those APIs. For example, the retry handler may parse the message to identify instructions for services to be accessed to update network resource data. In an example wherein messages are retrieved from the message queue system, the message payload data may be extracted to determine an appropriate location for retrying the message. In an example, the retry handler may identify message payload data and a message header data. In this example, message payload data may identify information associated with updating network resource data associated with the services. In an example wherein the message includes a transaction, the message payload data may include a transaction amount, recipient, and/or a payer. In some examples, the message header data may indicate APIs that can be used to access services associated with the message. For example, the message header data may indicate endpoint identifiers that identify APIs associated with relevant services. As an example, the message header data may indicate a first API that can be used to access a first service and a second API that can be used to access the second service. In some examples, the message handler may submit API calls to the APIs identified by the message header. For example, the message handler may submit API calls to the first service and the second service based on the information included in the message header.

At step 408, process 400 (e.g., using one or more components described above) may determine health status information for a first and second service. For example, the retry handler may determine health status information that indicates availability of network connections to the first and second service. In some examples, the retry handler may determine which services associated with the message failed to be accessed. In an example, the retry handler may determine that the first service (e.g., that manages account balances) was successfully accessed and that the second service (e.g., that generates GUIs displaying account details to users) was not successfully accessed. As a result, the retry handler may determine that the message payload data failed to be provided to the second service.

In some embodiments, the retry handler may determine the availability of services based on responses to API calls. In some examples, the retry handler may determine the response received from the initial attempt to process the message performed by the message handler. Alternatively, in response to receiving the message, the retry handler may submit API calls to the relevant services. In some examples, the message queue system may receive responses to API calls that indicate that the message payload data is able to be provided to the first service, but not the second service. In an example, the message queue system may submit a first API call to the first service and a second API call to the second service. In this example, the message queue system may receive an API response including a success response from the first service (e.g., HTTP status code 200 "OK", and/or the like) that indicates the message payload data was successfully received and processed. The message queue system may also receive an API response including an error response from the second service (e.g., HTTP status code 400 "Bad Request", and/or the like) indicating that the message payload data was not successfully received or processed. Based on this information, the retry handler may determine that the message payload data is unable to be provided to the second service.

In some examples, the retry handler may determine whether a message should be retried based on the responses to the API calls and/or the message. For example, the retry handler may determine why a message failed to be provided to the second service in response to receiving an API response including an error response from the second service. The failed message may fail to be provided due to a failed network connection and/or an aspect of the message (e.g., a schema that is incompatible with the second service). In response to determining that there is a failed network connection with the second service, the retry handler may determine that the message should be retried (e.g., at a later time). Alternatively, in response to determining that the message failed to be provided due to an aspect of the message, the retry handler may transfer the message from the failed message queue to the dead message queue.

In some embodiments, API responses may include a notification of a lack of network connectivity. For example, the second API response upon which the retry handler determines that the message failed to be provided to the second service may include a notification of a lack of network connectivity to communicate the message payload data to the second service (e.g., HTTP status code 502 "Service Unavailable", HTTP status code 502 "Bad Gateway", and/or the like). In an example, the notification may be transmitted from the network to the message queue system to indicate that a connection was unable to be established with the second service over the network. Alternatively, the notification may be transmitted from the second service to the message queue system to indicate that the second service was unable to properly receive and process the message. In some examples, the notification may include diagnostic information (e.g., logs, metric performance metrics, traffic analysis reports, and/or the like). In these examples, the retry handler may determine whether to place the message in the dead message queue based on the diagnostic information.

In some embodiments, the retry handler may determine that the second service is unavailable based on a lack of response to the second API call. For example, the retry handler may receive an API response to the first API call indicating that the message payload data is able to be provided to the first service. However, in this example, the retry handler may not receive the second API response to the second API call. In an example, the retry handler may determine that the second API response has not been received based on not receiving the second API response within a threshold period of time from submitting the second API call. In some examples, the retry handler may determine that the message payload data is unable to be provided to the second service based on the lack of response.

At step 410, process 400 (e.g., using one or more components described above) may determine a network connection disruption has ended. For example, the retry handler may determine an updated second health status of the second service indicating that the network connection to the second service has been restored. The updated second health status may be determined based on a response to an API call. In some examples, the retry handler may periodically submit API calls to the second service to determine whether a change to the second health status has occurred. The API calls may be more lightweight to transmit than the message, since they can be a single request to a predefined endpoint that returns a short response including a return status code. As a result, performing health status checks may be more efficient than attempting to retry the entire message. In an example, the retry handler may schedule health status checks of the second service based on retry logic in response to an indication from the failed message queue that the message has been placed within the failed message queue. The retry logic may define rules for when the service associated with the failed network connection should be reevaluated (e.g., to determine if the network connection has been restored) based on conditions such as the type of error encountered (e.g., the HTTP code received in the API response), the service that the message failed to be provided to, and/or the like. In an example, the retry logic may determine a predefined temporal interval. In this example, the health status updates associated with failed network connections may be detected in response to a network connection test (e.g., API call) submitted after the predefined temporal interval has elapsed. For messages that have already been retried, the retry logic may consider the number of previous attempts and the intervals between them. In some examples, a health status check may return an indication that the network disruption associated with the second service has ended. As an example, the retry handler may receive a status code (e.g., HTTP status code 200 "OK") indicating successful transmission of an API call to the second service. Based on this response, the retry handler may determine the updated second health status of the second service to be that the network connection disruption has ended.

At step 412, process 400 (e.g., using one or more components described above) may provide the message payload data to the second service. For example, the retry handler may provide the message payload data to the second service (e.g., the service that it previously failed to be provided to) in response to receiving the updated health status information associated with the second service. The updated health status information may be a status code received in response to an API call that indicates the second service has been successfully accessed. In some examples, the second service may successfully receive and process the message payload data. As a result, the second service may update associated second network resource data. Alternatively, the second service may fail to successfully receive and process the message payload data. As a result, the retry handler may return the message to the failed message queue. In some examples, the retry handler may evaluate returned messages to determine if they should be retried. For example, the failed message queue retry handler may transmit the returned message to the dead letter queue based on determining that it has satisfied a retry threshold. The retry threshold may comprise conditions that determine if a message should be retried (e.g., threshold number of retry attempts, time to live (TTL) of the message, and/or the like).

In some embodiments, the health status information describing availability of network resources may be stored in the network resource database. In an example, health status information of network resources associated with a received message may be stored in the network resource database by the message handler in response to initial processing of the message. Additionally, or alternatively, the retry handler may store health status information of network resources in response to determining health status information of network resources associated with a failed message. As an example, the retry handler may store indications that the first service was successfully accessed, and the second service was not successfully accessed in response to determining this health status information. In some examples, the health status information may be updated based on the receipt of updated health status information. For example, in response to determining the updated second health status of the second service, the retry handler may update the health status information of the second service in the network resource database.

At step 414, process 400 (e.g., using one or more components described above) may update network resource data. For example, the retry handler may update the network resource data in the network resource database in response to the message being successfully processed by the second service. Modifying the network resource data may include modifying the network resource data to reflect transmission of the message payload data. For example, the retry handler may modify a previous indication that the message payload data had not been successfully provided to the second service. Additionally, or alternatively, the retry handler may delete the message from the network resource database in response to determining that it has been successfully provided to all of the network resources that the message identifies should be accessed to update their respective network resource data.

In some embodiments, the second service may update its respective network resource data in response to receiving the message payload data. For example, the second service may modify one or more entries in a second service database based on the message payload data. The second service database may include the respective network resource data of the second service. As an example, the second service may update the second service database to reflect a new transaction indicated by the message payload data in response to receiving the message. In this example, the second service may update a GUI to display this transaction based on the update to the second service database.

Some embodiments of the present disclosure are described in connection with a threshold. As described herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for preventing network resource failures from incorrect network resource data resulting from failed messages within a message queue system.
2. The method of embodiment 1, comprising: detecting a message describing an event associated with an update to network resource data of a network resource that failed to be received by the network resource; determining that the message was added to a failed message queue; extracting, from the message, based on the message being added to the failed message queue, message payload data comprising instructions for services to be accessed to update the network resource data; determining health status information for a first service and a second service, the health status information indicating that the first service was successfully accessed and that access to the second service was unsuccessful; determining, based on an updated second health status of the second service received after a first amount of time, that a network connection disruption associated with the second service has ended, wherein a message service queue submits Application Programming Interface (API) calls to a second API associated with the second service periodically to determine whether a change to the health status information of the second service has occurred; providing the message payload data to the second service based on receipt of updated health status information indicating that the second service has been successfully accessed; and updating the network resource data stored by a network resource management database based on the message payload data being successfully provided to the second service.

3. The method of embodiment 2, further comprising: storing, using the network resource management database, first data describing a plurality of network resources, wherein the network resource data associated with the network resource comprises a portion of the first data.
4. The method of any one of embodiments 2-3, wherein detecting that the message failed to be received by the network resource further comprises: receiving, from a message producer device, the message; and determining, based on a messaging timeout condition being satisfied, that the message failed to be received by the network resource.
5. The method of any one of embodiments 2-4, wherein the messaging timeout condition being satisfied further comprises: measuring an amount of time that has elapsed since the message was received from the message producer device; determining, based on failing to receive a confirmation from the network resource that the message was received within a threshold amount of time, that the messaging timeout condition has been satisfied.
6. The method of any one of embodiments 2-5, further comprising: adding the message to the failed message queue based on a messaging timeout condition being satisfied.
7. The method of any one of embodiments 2-6, wherein determining that the message was added to the failed message queue further comprises: generating a notification that the message was added to the failed message queue, wherein the notification comprises the message.
8. The method of any one of embodiments 2-7, wherein extracting the message payload data further comprises: identifying, from the message payload data, message header data comprising metadata indicating a first API used to access the first service and the second API used to access the second service; and submitting, via a first API call and a second API call respectively provided to the first API and the second API, the message payload data to the first service and the second service.
9. The method of any one of embodiments 2-8, wherein determining the health status information further comprises: receiving, via the first API, a first API response to the first API call; receiving, via the second API, a second API response to the second API call; determining, based on the first API response, that the message payload data is able to be provided to the first service; and determining, based on the second API response, that the message payload data is unable to be provided to the second service.
10. The method of any one of embodiments 2-9, wherein determining that the message payload data is unable to be provided to the second service comprises: determining that the second API response comprises a notification of a lack of network connectivity to communicate the message payload data to the second service.
11. The method of any one of embodiments 2-10, wherein determining the health status information further comprises: receiving, via the first API, a first API response to the first API call indicating that the message payload data is able to be provided to the first service; and determining, based on a lack of a second API response being received, that the message payload data is unable to be provided to the second service.
12. The method of any one of embodiments 2-11, further comprising: transmitting, based on a health status update of the second service indicating that the second service is able to be accessed to provide the message payload data, the message payload data to the second service.
13. The method of any one of embodiments 2-12, wherein updating the network resource further comprises: modifying the network resource data stored in the network resource management database for the network resource to reflect transmission of the message payload data.
14. A method, comprising: receive, from a message producer device, a message describing an event associated with cloud-based services of the message producer device, wherein the message comprises message payload data to update first network resource data stored in the cloud-based services; extract, from the message payload data, interface information comprising a first application programming interface (API) of a first cloud-based service and a second API of a second cloud-based service with which to provide the message payload data to update the first network resource data; access a service health dashboard of a message service queue storing health status information for a plurality of cloud-based services including the first cloud-based service and the second cloud-based service; determine, based on the health status information, that a first network connection to connect to the first cloud-based service via the first API is available and a second network connection to connect to the second cloud-based service via the second API is unavailable; add the message to a failed message queue that stores messages relating to failed updates to network resource data, wherein the failed message queue determines, at a predefined temporal interval, whether one or more health status updates relating to one or more of the plurality of cloud-based services were received; detect, after the predefined temporal interval has elapsed, a health status update received by the failed message queue indicating that the second network connection is available; based on the health status update, provide, via the second API, the message payload data to the second cloud-based service; and responsive to determining that the message payload data has been provided to the first cloud-based service and the second cloud-based service, cause the network resource data stored by the network resource management database to be updated.

15. One or more non-transitory, computer-readable mediums storing instructions that, when executed by a data processing apparatus, cause the data processing apparatus to perform operations comprising those of any of embodiments 1-14.

16. A system comprising one or more processors; cloud-based memory configured to store a network resource management database comprising network resource data to be provided to network resources comprising cloud-based services; and cloud-based control circuitry configured to cause the processors to effectuate operations comprising the method of any of embodiments 1-14.

17. A system, comprising one or more processors programmed to perform the method of any one of embodiments 1-14.

18. A system comprising means for performing any of embodiments 1-14.

What is claimed is:

1. A system for preventing network resource failures from incorrect network resource data resulting from failed messages within a message queue system, the system comprising:

cloud-based memory configured to store a network resource management database comprising network resource data to be provided to network resources comprising cloud-based services;

cloud-based control circuitry configured to:

receive, from a message producer device, a message describing an event associated with cloud-based services of the message producer device, wherein the message comprises message payload data to update first network resource data stored in the cloud-based services;

extract, from the message payload data, interface information comprising a first application programming interface (API) of a first cloud-based service and a second API of a second cloud-based service with which to provide the message payload data to update the first network resource data;

access a service health dashboard of a message service queue storing health status information for a plurality of cloud-based services including the first cloud-based service and the second cloud-based service;

determine, based on the health status information, that a first network connection to connect to the first cloud-based service via the first API is available and a second network connection to connect to the second cloud-based service via the second API is unavailable;

add the message to a failed message queue that stores messages relating to failed updates to network resource data, wherein the failed message queue determines, at a predefined temporal interval, whether one or more health status updates relating to one or more of the plurality of cloud-based services were received;

detect, after the predefined temporal interval has elapsed, a health status update received by the failed message queue indicating that the second network connection is available;

based on the health status update, provide, via the second API, the message payload data to the second cloud-based service; and responsive to determining that the message payload data has been provided to the first cloud-based service and the second cloud-based service, cause the network resource data stored by the network resource management database to be updated.

2. A method, implemented by one or more processors of a computing system, the method comprising:

detecting a message describing an event associated with an update to network resource data of a network resource that failed to be received by the network resource;

determining that the message was added to a failed message queue;

extracting, from the message, based on the message being added to the failed message queue, message payload data comprising instructions for services to be accessed to update the network resource data;

determining health status information for a first service and a second service, the health status information indicating that the first service was successfully accessed and that access to the second service was unsuccessful;

determining, based on an updated second health status of the second service received after a first amount of time, that a network connection disruption associated with the second service has ended, wherein a message service queue submits Application Programming Interface (API) calls to a second API associated with the second service periodically to determine whether a change to the health status information of the second service has occurred;

providing the message payload data to the second service based on receipt of updated health status information indicating that the second service has been successfully accessed; and updating the network resource data stored by a network resource management database based on the message payload data being successfully provided to the second service.

3. The method of claim 2, further comprising:

storing, using the network resource management database, first data describing a plurality of network resources, wherein the network resource data associated with the network resource comprises a portion of the first data.

4. The method of claim 2, wherein detecting the message comprises:

receiving, from a message producer device, the message; and determining, based on a messaging timeout condition being satisfied, that the message failed to be received by the network resource.

5. The method of claim 4, wherein the messaging timeout condition being satisfied comprises:

measuring an amount of time that has elapsed since the message was received from the message producer device; and determining, based on failing to receive a confirmation from the network resource that the message was received within a threshold amount of time, that the messaging timeout condition has been satisfied.

6. The method of claim 2, further comprising:

adding the message to the failed message queue based on a messaging timeout condition being satisfied.

7. The method of claim 2, wherein determining that the message was added to the failed message queue comprises:

generating a notification that the message was added to the failed message queue, wherein the notification comprises the message.

8. The method of claim 2, wherein extracting the message payload data comprises:

identifying, from the message payload data, message header data comprising metadata indicating a first API used to access the first service and the second API used to access the second service; and submitting, via a first API call and a second API call respectively provided to the first API and the second API, the message payload data to the first service and the second service.

9. The method of claim 8, wherein determining the health status information comprises:

receiving, via the first API, a first API response to the first API call;

receiving, via the second API, a second API response to the second API call;

determining, based on the first API response, that the message payload data is able to be provided to the first service; and determining, based on the second API response, that the message payload data is unable to be provided to the second service.

10. The method of claim 9, wherein determining that the message payload data is unable to be provided to the second service comprises:

determining that the second API response comprises a notification of a lack of network connectivity to communicate the message payload data to the second service.

11. The method of claim 8, wherein determining the health status information comprises:

receiving, via the first API, a first API response to the first API call indicating that the message payload data is able to be provided to the first service; and determining, based on a lack of a second API response being received, that the message payload data is unable to be provided to the second service.

12. The method of claim 2, further comprising:

transmitting, based on a health status update of the second service indicating that the second service is able to be accessed to provide the message payload data, the message payload data to the second service.

13. The method of claim 12, wherein updating the network resource data comprises:

modifying the network resource data stored in the network resource management database for the network resource to reflect transmission of the message payload data.

14. One or more non-transitory computer-readable media storing computer program instructions that, when executed by one or more processors, effectuate operations comprising:

responsive to determining that a message was added to a failed message queue, extracting, from the message, message payload data comprising instructions for services to be accessed to update network resource data associated with a network resource;

determining, for a first service and a second service, health status information indicating that the first service was successfully accessed and that access to the second service was unsuccessful;

responsive to receiving, after a first amount of time, an updated health status of the second service, determining that a network connection disruption associated with the second service has ended, wherein a message service queue submits requests to the second service periodically for updates to the health status information;

responsive to receiving updated health status information indicating that the second service has been successfully accessed:

providing the message payload data to the second service; and updating the network resource data to store that the message payload data was successfully provided to the second service.

15. The one or more non-transitory computer-readable media of claim 14, wherein the operations further comprise:

storing first data describing a plurality of network resources, wherein the first data comprises the network resource data.

16. The one or more non-transitory computer-readable media of claim 14, wherein determining that the message being added to the failed message queue comprise:

determining, based on a messaging timeout condition being satisfied, that the message failed to be received by the network resource, wherein the messaging timeout condition being satisfied comprises:

measuring an amount of time that has elapsed since the message was received; and determining, based on failing to receive a confirmation from the network resource that the message was received within a threshold amount of time, that the messaging timeout condition has been satisfied.

17. The one or more non-transitory computer-readable media of claim 14, wherein the operations further comprises:

adding the message to the failed message queue based on a messaging timeout condition being satisfied.

18. The one or more non-transitory computer-readable media of claim 14, wherein determining that the message was added to the failed message queue comprises:

generating a notification that a new message was added to the failed message queue, wherein the notification identifies that the new message comprises the message.

19. The one or more non-transitory computer-readable media of claim 14, wherein extracting the message payload data comprises:

identifying, from the message payload data, message header data comprising metadata indicating a first API used to access the first service and a second API used to access the second service; and submitting, via a first API call and a second API call respectively provided to the first API and the second API, the message payload data to the first service and the second service.

20. The one or more non-transitory computer-readable media of claim 19, wherein determining the health status information comprises:

receiving, via the first API, a first API response to the first API call;

receiving, via the second API, a second API response to the second API call;

determining, based on the first API response, that the message payload data is able to be provided to the first service; and determining, based on the second API response, that the message payload data is unable to be provided to the second service.

* * * * *